United States Patent [19]

Miranda

[11] Patent Number: 5,716,438
[45] Date of Patent: Feb. 10, 1998

[54] RINSABLE NON-PLUGGING ANTI-SKID PRODUCTS

[75] Inventor: Jorge F. Miranda, Marietta, Ga.

[73] Assignee: Vinings Industries, Inc., Atlanta, Ga.

[21] Appl. No.: 672,372

[22] Filed: Jun. 25, 1996

[51] Int. Cl.$^6$ .................................. C09K 3/14
[52] U.S. Cl. .............. 106/36; 106/287.17; 106/287.26; 106/287.34
[58] Field of Search ................. 106/36, 287.17, 106/287.26, 287.34

[56] References Cited

U.S. PATENT DOCUMENTS

| | | | |
|---|---|---|---|
| 3,649,348 | 3/1972 | Vossos | 428/331 |
| 3,860,431 | 1/1975 | Payne et al. | 106/36 |
| 3,901,987 | 8/1975 | Payne et al. | 428/219 |
| 4,418,111 | 11/1983 | Carstens | 106/36 |
| 4,452,723 | 6/1984 | Carstens | 106/36 |
| 4,980,024 | 12/1990 | Payne et al. | 162/135 |
| 5,423,909 | 6/1995 | Gullickson | 106/36 |
| 5,466,493 | 11/1995 | Mefford et al. | 106/36 |
| 5,556,453 | 9/1996 | Labrash et al. | 106/36 |
| 5,569,318 | 10/1996 | Jarand | 106/36 |

FOREIGN PATENT DOCUMENTS

| | | | |
|---|---|---|---|
| 755202 | 2/1971 | Belgium | 106/36 |

OTHER PUBLICATIONS

Iler, Ralph K., The Chemistry of Silica, 1979, pp. 425–426 No Month.

*Primary Examiner*—Anthony Green
*Attorney, Agent, or Firm*—Laubscher & Laubscher

[57] ABSTRACT

An improved composition is provided for increasing the coefficient of friction of surfaces to which it is applied. The composition consists of an aqueous suspension of an ether and at least one material selected from the group comprising colloidal silica, colloidal silica and alumina, or colloidal silica and metal oxides, wherein the ratio of the material to the ether is from 1:1 to 25:1.

8 Claims, No Drawings

RINSABLE NON-PLUGGING ANTI-SKID PRODUCTS

BACKGROUND OF THE INVENTION

The current invention relates to new formulations of anti-skid products for use in increasing the friction properties of paper, paperboard, textiles, or other products. These formulations are safe for use and are easy to clean from the surrounding area.

For certain uses, surfaces of paper and board manufactured from virgin or recycled fiber are required to have minimum coefficients of friction. This requirement exists because the paper or board will be used to manufacture containers or other packaging which must be stacked, or because the paper or board itself must be stacked. For example, a stack of untreated paperboard could skid and fall when slightly inclined, or a stack of boxed materials could fall if slightly inclined or tilted. The coefficient of friction is typically measured by well established procedures for determining the slide angle and its tangent. Products that increase those quantities are commonly said to have anti-slip, anti-skid, non-slip, non-skid, slip resistance, frictionizing, etc. properties.

Products that increase the coefficient of friction are typically applied by spraying the required surface, although other methods involve application with rolls or even application at the wet-end of the papermaking process. Regardless of the method of application, the increased friction is often achieved by using products containing colloidal silica, alumina, their combinations, and other particulates such as calcium carbonate. Colloidal silica is the most commonly used frictionizing component.

Unfortunately unwanted silica deposits often occur in undesirable places, e.g., around or in the application equipment. Stripping problems are often observed even in the finished paper. In the case of spraying applications the narrow tips of the spray apparatus can easily get plugged, causing disruption or interruption of the spraying pattern or overspraying of certain areas.

BRIEF DESCRIPTION OF THE PRIOR ART

To overcome these problem of silica slurries, the prior art has proposed solutions involving treating the silica sol by adding glycerine, sorbitol or sugars, with glycerine as the preferred component. For example, U.S. Pat. No. 5,466,493 claims that benefits can be obtained by using a silica sol or silica with alumina sol (5 to 35% of total) treated with glycerine (1 to 10% of total) and optionally including either a polyhydric alcohol (0 to 10% of total) of structure $HOCH_2(CHOH)_n \cdot CH_2OH$ with $n=1$ to 4, like sorbitol or a sugar like sucrose or glucose.

U.S. Pat. No. 3,901,987 claims some benefits from a silica sol composition comprising mixtures of small and large particle size silica plus a polymeric flocculating agent plus a polyhydric alcohol claimed to act as antiflocculant for the undiluted formulation. The binding is ascribed to the polymeric flocculating agent. This prior art patent does not suggest or imply that the alcohol alone could act without the polymeric floculant. This is further evidenced by the search for other polymeric binders in the prior art. For example, a subsequent patent, U.S. Pat. No. 4,980,024, claims benefits from silica sols which include a polyacrylamide binder and glycerine.

However, problems exist with regard to the prior art solutions. The use of polymeric binders adds to the raw material cost. Polyhydric alcohols such as sorbitol and the sugars are crystalline in their own right, so their protection against unwanted deposition is only partial. In addition, they can act as a food source for microbiological organisms which can spoil the slurry or the finished paper product. Finally, glycerine is very expensive for this type of use and must be declared as a Hazardous Component in the Material Safety Data Sheet (MSDS) of the formulation.

Thus, there remains an unmet need for a component useful for raising the coefficient of friction of paper products that is effective, non-hazardous, inexpensive and that does not require a floculating agent.

SUMMARY OF THE INVENTION

The present invention meets that need by providing such a product. The current invention involves treating the silica slurry with one or more of the following water soluble high boiling point additives or their combinations: Diethylene glycol (DEG); Triethylene glycol; Polyethylene glycol, 300 MW or higher; Propylene glycol; or Triethanolamine.

Diethylene glycol is the preferred component because it offers certain specific advantages. It is much cheaper than glycerine. Significant saving can be realized since the organic component is a substantial part of the formulation and glycerine can become the highest raw material expense in prior art/formulations. DEC does not need to be listed in the MSDS, whereas glycerine requires reporting as a Hazardous Component by OSHA (8-hr TWA limit 10 $mg/m^3$).

Another advantage of DEC over glycerine is that DEC is more fluid than glycerine. Therefore a slurry containing DEC is less likely to require high pressure during spraying than a slurry containing glycerine. If the slurry is significantly diluted with water the pressures required tend to be the same, but in partially dried sprayer tips a high fluidity facilitates pushing any dried formulation out of the tips of the sprayer after a shut-down.

Finally, as described above, DEC is less effective as nutrient for native microbiological organisms that easily spoil slurries containing sorbitol or sugars.

DETAILED DESCRIPTION OF THE PREFERRED EMBODIMENT

The slurries of the present invention can be made by mixing colloidal silica with the appropriate amount of additives and, if needed, extra water. The order of addition is a matter of convenience. It can be varied without significantly affecting the process. Colloidal silica of various particle sizes are commercially available from Vinings Industries and other suppliers. Initial tests were conducted with commercial sols of 40–50% silica and formulations were prepared by adding other additives and/or water as required. The final silica content was from about 40% to about 0.5%.

A preservative or biocide was added for long term protection against microbiological spoilage. The preservative or biocide does not affect friction. The prefered preservative was Dowicil 75 at 0.1% to 0.04%, preferably 0.1% of active preservative. Using sources of contamination from around North America known to grow in colloidal silica media, much less microbiological growth was observed when the additive in the formulation was diethylene glycol than when it was a glycerine/sorbitol combination.

The colloidal silica sols used comprise particles sized in the 5 to 160 nm range and can result in either unimodal or multimodal particle size distributions. Thus mixtures of a large particle size distribution and a small particle size distribution will work.

An alumina sol can be part of the composition. Experience has shown that deposition problems arise more often from use of the silica or aluminum silicates than from just alumina.

The slurries containing the additives described herein were stable and are not prone to freezing due to the addition of the additives. Freeze-thaw tests were conducted on slurries containing DEG levels which varied between 7.2 and 17 percent of the wet formulation and silica levels which varied between 34 to 38 percent of the wet formulations. All performed well, with no observed problems. The above percentages are not limits, but were chosen for convenience.

The pH of the silica and related sols affect their stability characteristics, as discussed by Iler. It was observed that the additive did not adversely affect the stability at a given pH. Leaving aside considerations of long term stability, the benefits in terms of increased rinsability were manifested in slurries at any pH tested, from about 2 to about 10. They were also manifested in an alumina sol containing no silica and in a silica sol containing some alumina.

The organic additive should be miscible with water and less volatile than water. The following were found to be suitable as organic additives:

1) an ether of structure $H[OCH_2CH_2]_n OH$ where n=2 to 10 and mixtures of such ethers. The preferred additive is diethylene glycol (DEG),
2) an ether of structure $H[OCH(CH_3)(H)CH]_n OH$ where n=1 to 10 and isomers and mixtures of such ethers,
3) triethanol amine
4) any combination of 1, 2 and 3 above
5) any combination of 1 to 4 above with polyals of structure $HOCH_2(CHOH)_n CH_2OH$ with n=1 to 4, like glycerine, sorbitol, and a variety of sugars and mixtures thereof.

The slurries containing the above-described additives, when not contained in a dosed system, begin to lose water, the more volatile component. Their viscosity begins to increase. The appearance of an open sample gradually changes from liquid, to a viscous liquid, to a creamy and sticky paste, to rubbery, to solid. Depending on the amount of additive this transformation can take several days. Even when a solid forms it remains clear, as opposed to the white added which forms if no additive is present. A transformation from an aquasol to an organosol takes place as water ceases to be the main solvent. The organosol with a high silica content is viscous and has some tackiness. In a sense it acts as a binder for the silica and no extra binder is required, as described below. It also explains the ready redispersion that takes place upon water addition, making clean-up an easy task. Before clean-up, the temporary accumulation of material has a transparent appearance and during clean-up it rinses off immediately with water.

By contrast, when no additive is used, the silica readily forms white deposits on most surfaces, even on previously dried silica. The deposits can accumulate and become very hard. As an example, deposition of silica may begin to be noticeably white within about an hour, depending on composition. The deposition from formulations containing additives remains clear and may take from a day to a week to form, depending on the amount of additives present. Some will remain clear after several months. Absolute time numbers depend on additive level, thickness of the applied sample, temperature and air currents.

The properties described above resulting from the use of the claimed additive benefit the increase in the friction between target surfaces. Although the additive on its own is not expected to increase the coefficient of friction, and the particulate matter is the main reason for the friction, the additive can help bind or maintain the silica on the paper or modify the ultimate distribution and geometry of the silica agglomerates on the paper. It pressureably acts by holding the silica on the paper upon water loss and by preventing the silica from hardening too quickly onto itself before attachment to the fiber network. This proposed mechanism is particularly relevant to applications where the product is applied by spraying or by coating to a dry or humid paper surface rather than to the wet-end water system.

Pilot trials were conducted in a mill producing linerboard using 100%-recycled fiber making 42-lb linerboard using spray application. The dosage rate could be reduced significantly without affecting the slide angle that was previously obtained in the absence of the additive. The optimum efficiency was higher with the new formulation, as shown in the following table.

| Test Reel | Silica Dry LB/T | Degrees Gain | Silica Efficiency in Degrees Gain/LB | Product Formula |
|---|---|---|---|---|
| 2142 | 0.93 | 10 | 10.71 | SiO2 |
| 2143 | 0.93 | 11 | 11.89 | SiO2 |
| 2144 | 0.92 | 5 | 5.42 | SiO2 |
| 2145 | 1.23 | 7 | 5.69 | SiO2 |
| 2146 | 1.40 | 10 | 7.15 | SiO2 |
| 2147 | 1.76 | 12 | 6.84 | SiO2 with DEG |
| 2148 | 1.50 | 11 | 7.35 | SiO2 with DEG |
| 2149 | 1.26 | 8 | 6.37 | SiO2 with DEG |
| 2150 | 1.20 | 15 | 12.52 | SiO2 with DEG |
| 2151 | 0.86 | 12 | 14.01 | SiO2 with DEG |
| 2152 | 1.06 | 11 | 10.35 | SiO2 |
| 2153 | 1.06 | 10 | 9.44 | SiO2 |
| 2154 | 1.04 | 9 | 8.68 | SiO2 |

In order to compare the propensity to form deposits and the cleanability of formulations with and without additives, some experiments were carded out in a four tip spray bar with the same tips used in actual mill applications. The spray was directed against an originally transparent plastic screen. The surrounding surfaces were metallic. The four tips were commercial tips made of plastic or of stainless steel. A formulation without the additive lead to formation of white deposits within one hour of spraying. Scrubbing was needed to clean up the deposits. One of the tips plugged during a stop period and an increase in pressure was needed to clean it up. By contrast, a formulation containing the claimed additive showed only a clear sticky material. It was easily rinsed off with water. No tip plugging was observed after stopping, air drying the area, and restarting the spraying. Clean up in general, of equipment and floor, was much easier when the additive was part of the formulation. In a laboratory experiment, spraying of a formulation containing the additive on linerboard resulted in the following succesive slide angles: 36,35,35,33,33,35,34,34,36,34,35. This illustrates the permanence of the slide angle after succesive slides.

| Silica and DEG Combinations | | | | | | | | | | | | |
|---|---|---|---|---|---|---|---|---|---|---|---|---|
| Parts per 100 parts of total (wet) formulation | | | | | | | | | | | | |
| 50% silica | 2.0 | 6.0 | 10.0 | 16.0 | 24.0 | 50.0 | 66.0 | 80.0 | 86.0 | 90.0 | 96.0 | 98.0 |
| DEG | 33.0 | 75.0 | 85.0 | 80.0 | 60.0 | 25.0 | 9.9 | 6.0 | 5.6 | 4.5 | 1.9 | 1.5 |
| Extra Water | 64.9 | 18.9 | 4.9 | 3.9 | 15.9 | 24.9 | 24.0 | 13.9 | 8.3 | 5.4 | 2.0 | 0.4 |
| biocide | 0.1 | 0.1 | 0.1 | 0.1 | 0.1 | 0.1 | 0.1 | 0.1 | 0.1 | 0.1 | 0.1 | 0.1 |
| total (wet) formulation | 100.0 | 100.0 | 100.0 | 100.0 | 100.0 | 100.0 | 100.0 | 100.0 | 100.0 | 100.0 | 100.0 | 100.0 |
| total water | 65.9 | 21.9 | 9.9 | 11.9 | 27.9 | 49.9 | 57.0 | 53.9 | 51.3 | 50.4 | .50.0 | 49.4 |
| Equivalent Parts of Dry Silica | | | | | | | | | | | | |
| $SiO_2$ dry | 1.0 | 3.0 | 5.0 | 8.0 | 12.0 | 25.0 | 33.0 | 40.0 | 43.0 | 45.0 | 48.0 | 49.0 |
| Ratios | | | | | | | | | | | | |
| dry $SiO_2$: DEG | 0.03 | 0.0 | 0.1 | 0.1 | 0.2 | 1.0 | 3.3 | 6.1 | 7.7 | 10.0 | 25.0 | 33.3 |
| DEG: dry $SiO_2$ | 33.0 | 25.0 | 17.0 | 10.0 | 5.0 | 1.0 | 0.3 | 0.2 | 0.13 | 0.10 | 0.04 | 0.03 |

Accordingly, the reader will see that the addititive brings advantages in terms of efficiency, retention or permanence of the slide angle, cleanability from metal or plastic parts, prevention of plastic or metal tip plugging, freeze-thaw stability, lower spraying pressures, lower viscosity, lower surface tension, being non-hazardous, non-corrosive and useful for virgin or with incorporation of up to 100%-recycled fibers.

Although the description above contains some details and examples, these should not be construed as limiting the scope of the invention but as merely providing illustrations of some of the; presently preferred embodiments of this invention. For example, a person skilled in the art will realize that the additive will also work in conjunction with partial subtitution of the additives of this invention by glycerine, sorbitol, or other high boiling and miscible material, like polyhydric alcohols. Similarly other polyethers, like propylene glycols and mixed or blocked propylene glycol—ethylene glycol copolymers or the esters of the above glycols will work provided they meet the requirements described above. Similarly, it will also work when part of the silica is treated with or substituted by other metal oxide derived materials, like alumina. Finally, the invention will also prove useful on textiles or other materials which, in a particular use, would benefit from a higher coefficient of friction. Thus the scope of the invention should be determined by the appended claims and their legal equivalents, rather than by the examples given.

What is claimed is:

1. A composition useful for increasing the coefficient of friction of surfaces when applied thereto, consisting essentially of:

(a) an aqueous suspension of at least one of an ether and a mixture of ethers of structure $H[OCH_2CH_2]_nOH$, where n=2 to 14; and (b) at least one material selected from the group consisting of colloidal silica and alumina, wherein the ratio of component (b) to component (a) is from 1:1 to 25:1.

2. A composition useful for increasing the coefficient of friction of surfaces when applied thereto, consisting essentially of:

(a) an aqueous suspension of at least one of an ether, a mixture of ethers, and a mixture of isomers of structure $H[OCH(CH_3)(H)CH]_nOH$, where n=1 to 10; and (b) at least one material selected from the group consisting of colloidal silica and alumina, wherein the ratio of component (b) to component (a) is from 1:1 to 25:1.

3. A composition useful for increasing the coefficient of friction of surfaces when applied thereto, consisting essentially of:

(a) an aqueous suspension of triethanol amine; and (b) at least one material selected from the group consisting of colloidal silica and alumina, wherein the ratio of component (b) to component (a) is from 1:1 to 25:1.

4. A composition useful for increasing the coefficient of friction of surfaces when applied thereto, consisting essentially of:

(a) an aqueous suspension containing at least one of a first ether and a mixture of first ethers of structure $H[OCH_2CH_2]_n$ OH, where n=2 to 10, a second ether and a mixture of second ethers of structure $H[O(CH_3)(H)CH]_n$ OH, where n=2 to 10, and triethanol amine; and (b) at least one material selected from the group consisting of colloidal silica and alumina, wherein the ratio of component (b) to component (a) is from 1:1 to 25:1.

5. A composition useful for increasing the coefficient of friction of surfaces when applied thereto, consisting essentially of:

(a) an aqueous suspension of at least one of an ether and a mixture of ethers of structure $H[OCH_2 CH_2]_n$ OH, where n=2 to 14;

(b) at least one material selected from the group consisting of colloidal silica and alumina, wherein the ratio of component (b) to component (a) is from 1:1 to 25:1; and (c) a polyol of structure $HOCH_2(CHOH)_n CH_2$ OH, where n=1 to 4.

6. A composition useful for increasing the coefficient of friction of surfaces when applied thereto, consisting essentially of:

(a) an aqueous suspension of at least one of an ether, a mixture of ethers, and a mixture of isomers of structure $H[OCH(CH_3)(H)CH]_n$ OH, where n=1 to 10;

(b) at least one material selected from the group consisting of colloidal silica and alumina, wherein the ratio of component (b) to component (a) is from 1:1 to 25:1; and (c) a polyol of structure $HOCH_2 (CHOH)_n CH_2$ OH, where n=1 to 4.

7. A composition useful for increasing the coefficient of friction of surfaces when applied thereto, consisting essentially of:

(a) an aqueous suspension of triethanol amine;

(b) at least one material selected from the group consisting of colloidal silica and alumina, wherein the ratio of component (b) to component (a) is from 1:1 to 25:1; and (c) a polyol of structure $HOCH_2 (CHOH)_n CH_2 OH$, where n=1 to 4.

8. A composition useful for increasing the coefficient of friction of surfaces when applied thereto, consisting essentially of:

(a) an aqueous suspension containing at least one of a first ether and a mixture of first ethers of structure $H[OCH_2 CH_2]_n OH$, where n=2 to 10, a second ether and a mixture of second ethers of structure $H[O(CH_3)(H)CH]_n OH$, where n=2 to 10, and triethanol amine;

(b) at least one material selected from the group consisting of colloidal silica and alumina, wherein the ratio of component (b) to component (a) is from 1:1 to 25:1; and (c) a polyol of structure $HOCH_2 (CHOH)_n CH_2 OH$, where n=1 to 4.

* * * * *